US006700932B2

(12) United States Patent
Shen et al.

(10) Patent No.: US 6,700,932 B2
(45) Date of Patent: Mar. 2, 2004

(54) MPEG VIDEO EDITING-CUT AND PASTE

(75) Inventors: Wei-Le Shen, San Jose, CA (US); Shih-Chieh Hsu, Fremont, CA (US); Christopher Tseng, San Jose, CA (US); Hung-Ju Lee, Santa Clara, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 376 days.

(21) Appl. No.: 09/800,765

(22) Filed: Mar. 6, 2001

(65) Prior Publication Data

US 2002/0126754 A1 Sep. 12, 2002

(51) Int. Cl.$^7$ .......................... H04N 7/12; H04N 11/04
(52) U.S. Cl. .......................... 375/240.12; 375/240.26; 382/232; 370/498; 386/52
(58) Field of Search .................. 375/240.12, 240.26; 382/232; 370/498; 386/52

(56) References Cited

U.S. PATENT DOCUMENTS

| | | | | |
|---|---|---|---|---|
| 6,400,886 B1 | * | 6/2002 | Brewer et al. | 386/52 |
| 6,529,555 B1 | * | 3/2003 | Saunders et al. | 375/240.26 |
| 6,584,273 B1 | * | 6/2003 | Ashley et al. | 386/52 |
| 6,611,624 B1 | * | 8/2003 | Zhang et al. | 382/232 |
| 2002/0041628 A1 | * | 4/2002 | Anderson et al. | 375/240.12 |
| 2002/0196850 A1 | * | 12/2002 | Liu et al. | 375/240.12 |

OTHER PUBLICATIONS

Jianhao Meng and Shih–Fu Chang, CVEPS–Acompressed Video Editing and Parsing System, Department of Electrical Engineering & Center for Image Technology for New Media Columbia University 1996.*
Jianhao Meng and Shih–Fu Chang, Tools for Compressed–Domain Video Indexing and Editing, Department of Electrical Engineering & Center for Telecomunications Research Columbia University 1996.*
Jianhao Meng and Shih–Fu Chang, Buffer Control Techniques for Compressied–Domain Video Editing, Department of Electrical Engineering & Center for Telecomunications Research Columbia University 1996.*

P.J. Brightwell, S.J. Dancer, M.J. Knee Flexible Switching and Editing of MPEG–2 Video Bitstreams, BBC, UK and Snell & Wilcox, UK, 1997 International Broadcasting Convention Conference publication No. 447 IEE.*

A Low Cost Editor For MPEG–1 System Streams, Jiun Shiu, Shuo Cheng, Ja–Ling Wu, Chung Hung Lin and Jiun Jie Huang, Department of Computer Science and Information Engineering, National Taiwan University, 1995 IEEE.*

Jianhao Meng and Shih–Fu Chang, "Buffer Control Techniques For Compressed–Domain Video Editing," ©1996 IEEE, pp. 600–603.

Jianhao Meng and Shih–Fu Chang, "CVEPS—A Compressed Video Editing And Parsing System," ACM Multimedia 1996 Conference, Boston, MA, pp. 43–53.

Jianhao Meng and Shih–Fu Chang, "Tools For Compressed–Domain Video Indexing And Editing," SPIE vol. 2670, 1996, pp. 180–191.

* cited by examiner

*Primary Examiner*—Andy Rao
*Assistant Examiner*—Charles E Parsons
(74) *Attorney, Agent, or Firm*—Charles J Kulas; Carpenter & Kulas, LLP

(57) ABSTRACT

A system and method for editing a bitstream is provided. A first segment is cut from a first bitstream and a second segment is cut from a second bitstream. In cutting the segments from the bitstreams, first and last GOPs in the segments can be cut between frames in the GOP. The number of frames of the broken GOP is then compared to a pre-determined threshold value. If the number of frames of the broken GOP is less than or equal to the threshold value, the broken GOP is combined with a neighboring GOP. Therefore, the newly created GOP is longer than the standard size regular GOP. However, if the number of frames in the broken GOP is greater than the threshold value, a new GOP is created with the frames of the broken GOP. Therefore, the newly created GOP is shorter than the standard size regular GOP.

29 Claims, 4 Drawing Sheets

MPEG VIDEO EDITING-CUT AND PASTE

BACKGROUND OF THE INVENTION

The present invention relates to the field of audio/visual content. More specifically, one embodiment provides a system for editing bitstreams in a compressed environment.

The amount of multi-media content and digital video is growing and has become essential for media applications. The Moving Picture Experts Group ("MPEG") has developed a series of standards (MPEG-1, MPEG-2, . . . ) to provide a means for representing digital video and audio signals in a compressed form.

In an MPEG environment, video sequences are represented by compressed bitstreams, which are composed of group of pictures ("GOP") units. A GOP is usually fixed at a certain number of frames, such as 15 frames, and can contain intra ("I"), predicted ("P"), and bi-directional ("B") frames. An I frame can be independently encoded or decoded and contains only information present in the frame itself. However, a P and B frame must be encoded or decoded using information from a reference frame, which can be either an I or P frame. Accordingly, a P frame is encoded or decoded depending on a past reference frame and a B frame can be encoded or decoded with a dependence on a past frame, a future frame, or both past and future frames. Further, each GOP can be independently decoded without reference to other GOPs.

Manipulation of these video sequences has become increasingly popular and various methods have been proposed to edit MPEG bitstreams. For example, a straightforward way to edit MPEG bitstreams is to decode all the segments, edit the segments, and then re-encode the edited decompressed frames into new MPEG bitstreams. However, two major drawbacks of this approach are (1) the process is too computationally intensive, and (2) the accumulated quality losses associated with multiple editing.

Additionally, compressed domain editing solutions have been developed. When applying editing operations, e.g., cut and paste operations on MPEG video bitstreams, two important issues related to: (1) frame type conversion and (2) buffer constraint must be taken into account. A frame type conversion involves decoding and re-encoding a frame type of a GOP to another frame type. For example, a B frame could be decoded and re-encoded to an I frame. However, decoding and re-encoding frames could present problems related to buffer control. An I, P, and B frame each contain a different number of bits with a common ratio in the art as 100:10:1 for I, P, and B frames respectively. Thus, the number of bits needed for I, P, and B frames can be compared as I>P>B. Basically, I frames contain the most number of bits with P frames containing less, and B frames containing the least. Therefore, I frames contain the most information with P frames containing less, and B frames containing the least. Usually, these relationships generally follow the common ratio of 100:10:1. Thus, a conversion of a B frame to an I frame would result in great bitrate reduction. In other words, the converted I frame would contain 100 times more bits than the original B frame. Also, in a constant-bit-rate encoding, where video sequences are encoded with rate control constraints, the bitrate increase could result in overflow/underflow issues at the decoder buffer.

FIG. 1 shows an example of a compressed domain editing solution. A cut and paste editing operation on first and second MPEG bitstreams where a frame type conversion is conducted by simply re-encoding a few frames to generate a shorter GOP starting with an I frame is shown.[1] Basically, a segment is cut out of MPEG bitstream I and pasted into the new MPEG bitstream. As shown, the segment contains a first broken GOP of four frames, a GOP, an indeterminate number of GOPs, a GOP, and a second broken GOP of three frames. Additionally, a second segment is cut out of MPEG bitstream 2 and pasted into the new MPEG bitstream. As shown, the second segment contains a first broken GOP of three frames, a GOP, an indeterminate number of GOPs, a GOP, and a second broken GOP of four frames.

[1] J. Meng and S. F. Chang, "Buffer Control Techniques for Compressed-domain Video Editing," The Proceedings of IEEE International Conference on Image Processing, pp. 600–03, 1996. J. Meng and S. F. Chang, "CVEPS: A Compressed Video Editing and Parsing System," ACM Multimedia Conference, Boston, Mass., November 1996.

A frame type conversion is conducted by re-encoding the first frame of the first broken GOPs in both segments to an I frame. As shown in FIG. 1, the B frame of the first segment in the first broken GOP is converted from a B frame to an I frame and the P frame of the second segment in the first broken GOP is converted from a P frame to an I frame. In addition to performing the frame-type conversion, the four newly created GOPs have a shorter GOP size. For example, the first GOP of the first segment is four frames in length, the last GOP of the first segment is three frames, the first GOP of the second segment is three frames, and the last GOP of the second segment is four frames.

Some drawbacks of the approach in FIG. 1 can be summarized in terms of video quality, bitrate control, and flexibility. The frame type change from a B to I frame usually generates the worst video quality because a B frame is bi-directionally encoded from its predicted frames so that a B frame contains only minimum information. Basically, the I frame should be coded with much more information. Also, a big bitrate change from a B frame to I frame (e.g., in a factor of 50 or more) usually causes the difficulty of controlling the bitrate given the video buffer constraint as mentioned above. Further, if a segment only contains one frame, the bitrate and buffer control becomes complicated and difficult and resulting in less flexibility.

SUMMARY OF THE INVENTION

A system and method for editing a bitstream is provided by virtue of the present invention. In one embodiment, a first segment is cut from a first bitstream, which contains multiple GOPs. Additionally, a second segment is cut from a second bitstream, which also contains multiple GOPs. In cutting the segments from the bitstreams, the first and last GOPs in the segments can be cut between frames in the GOP. Thus, a segment can contain a broken GOP at the beginning and/or the end of the segment where a frame type conversion might be required.

The number of frames of the broken GOP is then compared to a predetermined threshold value. If the number of frames of the broken GOP is less than or equal to the threshold value, the broken GOP is combined with a neighboring GOP. For example, the broken GOP is combined with the next GOP if the broken GOP is the first GOP in the cut segment or the broken GOP is combined with the previous GOP if the broken GOP is the last GOP in the cut segment. Therefore, the newly created GOP is longer than the standard size regular GOP. Additionally, the reference frames in the broken segment will be converted to either a B or P frame depending on the frame type of the reference frame and the position of the reference frame. For example, either a P frame is converted to a B frame or an I frame is converted to a P frame. Further, most of B frames in the broken GOP will be modified depending on their positions. If a B frame needs to be converted, it will become one directional prediction only. Those B frames in the first broken GOP will become backward prediction only. But those B frames in the last broken GOP will become forward prediction only. However, if the last frame in the last broken GOP is a P frame, those B frames between I frame and P frame will remain unchanged. Additionally, only B frames in the broken GOP need to be changed. Those frames inside a complete GOP remain unchanged.

J. Meng and S. F. Chang, "Tools for Compressed-Domain Video Indexing and Editing," SPIE Conference on Storage and Retrieval for Image and Video Database, San Jose, February 1996.

However, if the number of frames in the broken GOP is greater than the threshold value, a new GOP is created with the frames of the broken GOP. Therefore, in this case, the newly created GOP is shorter than the standard size regular GOP. Additionally, the first reference frame in the first broken GOP is converted to an I frame. For example, a first P frame becomes an I frame in the newly created GOP. Additionally, any B frames right before the new I frame are converted to backward prediction only.

In the last broken GOP case, if the last frame in the last broken GOP is a P frame, the directional conversion of the B frames does not need to be applied. But, if the last frame in the last broken GOP is a B frame, all B frames right after the last P frame will be converted from bi-directional prediction to forward prediction. Finally, the edited segments from the first and second bitstream are combined to create a new bitstream.

Although only two bitstreams were used to describe this process, it is noted that there is no limit to the number of bitstreams that can be cut, edited, and pasted into a new bitstream.

In an embodiment of a computer-readable medium, a computer system includes instructions for editing a plurality of bitstreams. The computer readable medium comprising: one or more instructions for cutting a plurality of segments from the plurality of bitstreams, the plurality of segments comprising at least one group of frames, wherein the at least one group of frames comprises at least one broken group of frames; one or more instructions for comparing a number of frames of the at least one broken group of frames in the plurality of segments to a threshold value; one or more instructions for editing the plurality of segments according to the comparison; and one or more instructions for creating a new bitstream by combining the edited plurality of segments.

In an embodiment of a computer data signal embodied in a carrier wave, the signal is generated by a method and includes instructions for editing a plurality of bitstreams comprising: one or more instructions for cutting a plurality of segments from the plurality of bitstreams, the plurality of segments comprising at least one group of frames, wherein the at least one group of frames comprises at least one broken group of frames; one or more instructions for comparing a number of frames of the at least one broken group of frames in the plurality of segments to a threshold value; one or more instructions for editing the plurality of segments according to the comparison; and one or more instructions for creating a new bitstream by combining the edited plurality of segments.

A further understanding of the nature and advantages of the invention herein may be realized by reference to the remaining portions of the specification and the attached drawings.

DESCRIPTION OF THE PREFERRED EMBODIMENTS

Figure 1:
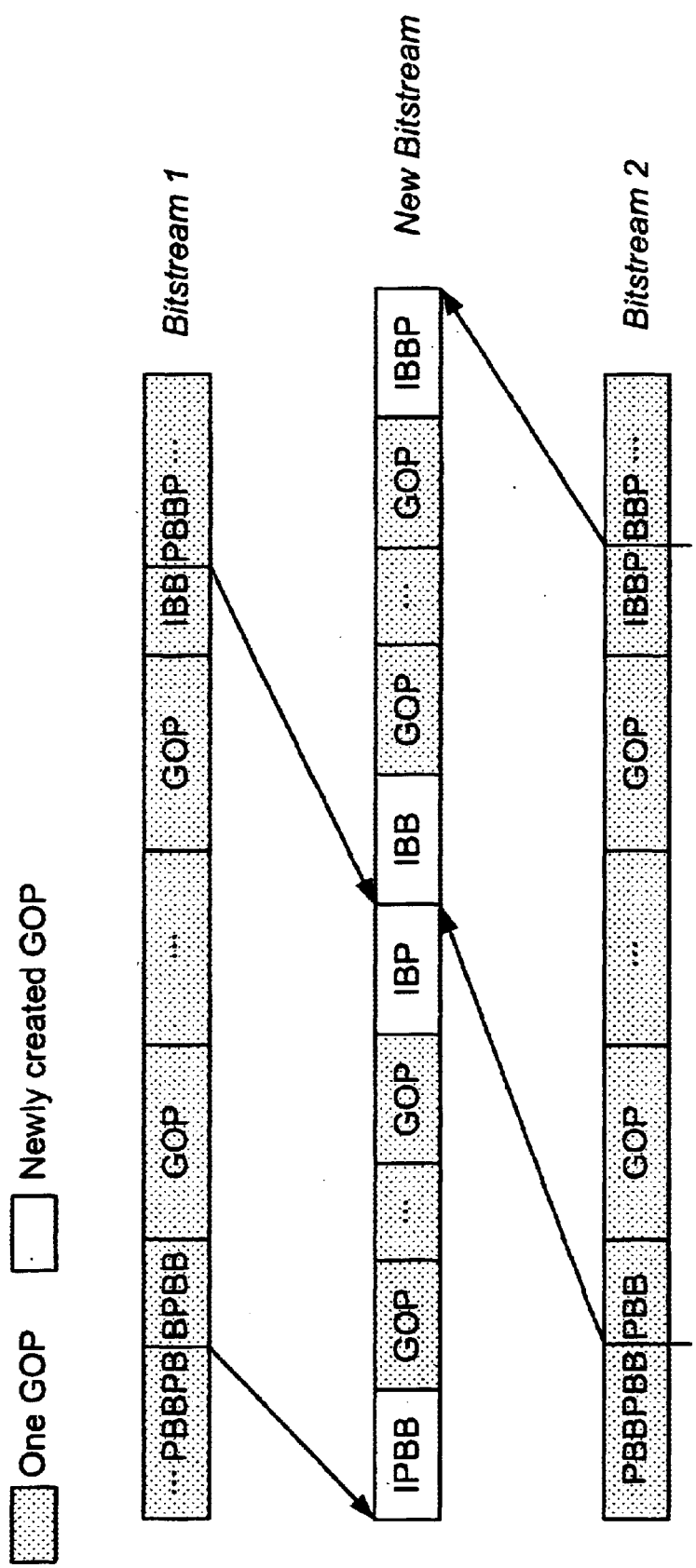
FIG. 1 is an illustration of a prior editing process.
Figure 2:
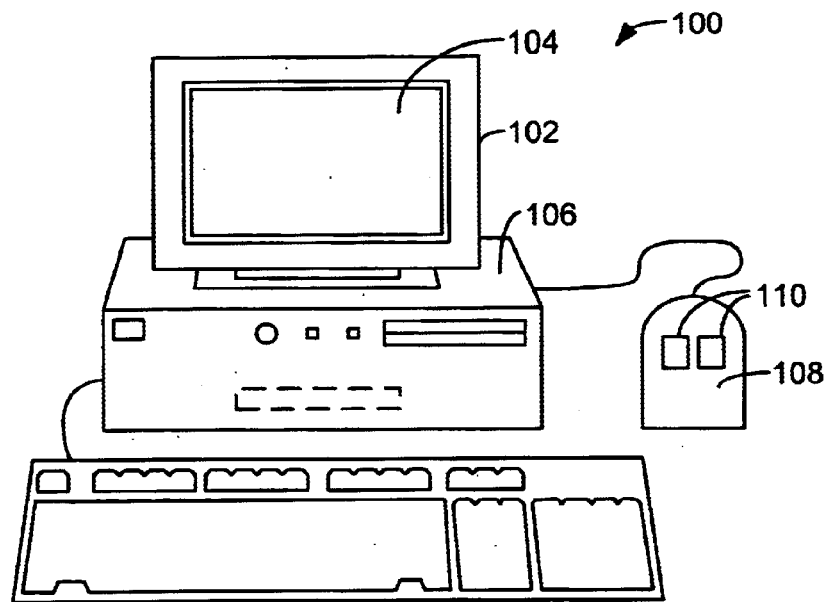
FIG. 2 is an illustration of a computer system suitable for use with the present invention.

FIG. 2 shows a computer system 100 suitable for use to provide a system in accordance with the present invention. The computer system 100 includes a display 102 having a display screen 104. A cabinet 106 houses standard computer components (not shown) such as a disk drive, CD-ROM drive, display adapter, network card, random access memory (RAM), central processing unit (CPU) and other components, subsystems and devices. User input devices such as a mouse 108 having buttons 110, and a keyboard 112 are shown. Other user input devices such as a trackball, touch-screen, digitizing tablet, etc., can be used. In general, the computer system 100 is illustrative of one type of computer system, such as a desktop computer, suitable for use with the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Figure 3:
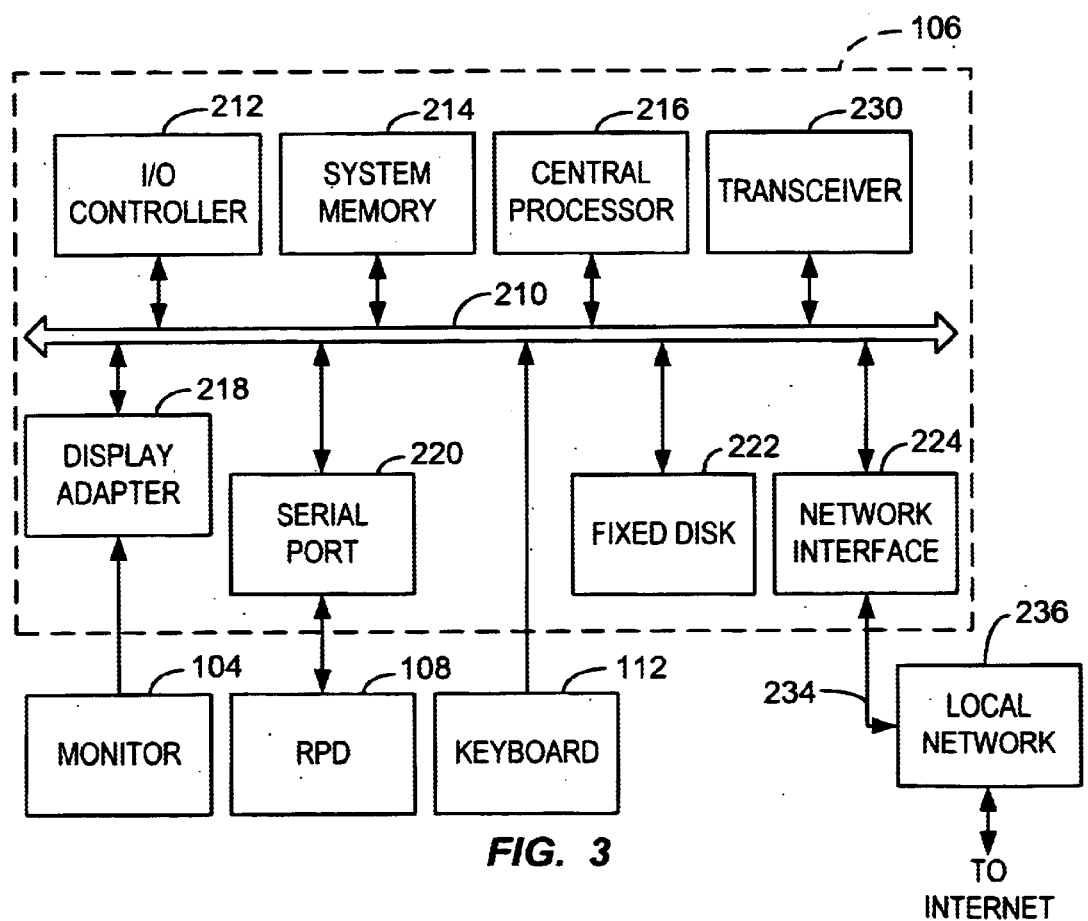
FIG. 3 shows subsystems in the computer system of FIG. 2.

FIG. 3 illustrates subsystems found in the computer system 100. Subsystems within box 106 are directly interfaced to an internal bus 210. The subsystems include input/output (I/O) controller 212, system random access memory (RAM) 214, central processing unit (CPU) 216, display adapter 218, serial port 220, fixed disk 222, network interface adapter 224 and transceiver 230. The use of the bus allows each of the subsystems to transfer data among the subsystems and, most importantly, with the CPU. External devices can communicate with the CPU or other subsystems via the bus by interfacing with a subsystem on the bus. The monitor 104 connects to the bus through the display adapter 218. A relative pointing device (RPD) such as a mouse 108 connects through the serial port. Some devices such as keyboard 112 can communicate with the CPU by direct means without using the main data bus as, for example, via an interrupt controller and associated registers (not shown). The transceiver 230 can be coupled with a satellite system, cable system, telephone lines or any other system suitable for propagating information. The transceiver can include or be coupled with a communication interface, which can be coupled with bus 210.

FIG. 3 is illustrative of one suitable configuration for providing a system in accordance with an embodiment of the present invention. Subsystems, components or devices other than those shown in FIG. 3 can be added without deviating from the scope of the invention. A suitable computer system can also be achieved without using all of the subsystems shown in FIG. 3. Other subsystems such as a CD-ROM drive, graphics accelerator, etc., can be included in the configuration without affecting the performance of the system included in an embodiment of the present invention.

The invention is related to the use of apparatus, such as the computer system 100, for implementing a MPEG video cut and paste operation on a plurality of bitstreams. According to one embodiment of the invention, video cut and paste operations on MPEG bitstreams is provided by the computer system 100 in response to the processor 216 executing one or more sequences of one or more instructions contained in the system memory 214. Such instructions may be read into memory 214 from a computer-readable medium, such as a fixed disk 222. Execution of the sequences of instructions contained in the memory 214 causes the processor to perform the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to the processor 214 for execution. Such media can take many forms, including, but not limited to, non-volatile media, volatile media and transmission media. Non-volatile media include, for example, optical or magnetic disks, such as a fixed disk 222. Volatile media include dynamic memory, such as memory 214. Transmission media include coaxial cables, copper wire and fiber optics, including the wires that comprise the bus 210. Transmission media can also take the form of acoustic or light waves, such as those generated during radio frequency (RF) and infra-red (IR) data communications. Common forms of computer-readable media include, for example, a floppy disk, a flexible disk, a hard disk, magnetic tape, any other magnetic medium, a CD-ROM disk, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 216 for execution. For example, the instructions may initially be borne on a magnetic disk of a remote computer. The remote computer can load the instructions into its dynamic memory and send the instructions over a telephone line using a modem. A modem local to the computer system 100 can receive the data on the telephone line and use an infrared transmitter to convert the data to an infrared signal. An infrared detector coupled with the bus 210 can receive the data carried in the infrared signal and place the data on the bus. The bus carries the data to the memory 214, from which the processor retrieves and executes the instructions. The instructions received by the memory can optionally be stored on the fixed disk 222 either before or after execution by the processor.

The computer system 100 also includes a network interface 224 or communication interface coupled to the bus 210. The network interface or communication interface provides a two-way data communication coupling with a network link 234 that is connected to a local network 236. For example, the network interface or communication interface can be an integrated services digital network (ISDN) card or a modem to provide a data communication connection to a corresponding type of telephone line. As another example, the network interface or communication interface can be a local area network (LAN) card to provide a data communication connection to a compatible LAN. Wireless links can also be implemented. In any such implementation, the network interface 224 or the communication interface and transceiver 230 send and receive electrical, electromagnetic or optical signals that carry digital data streams representing various types of information.

The network link 234 typically provides data communication through one or more networks to other data devices. For example, the network link can provide a connection through the local network 236 to a host computer or to data equipment operated by an Internet Service Provider (ISP). The ISP in turn provides data communication services through the worldwide packet data communication network, now commonly referred to as the "Internet." The local network and the Internet both use electrical, electromagnetic or optical signals that carry digital data streams. The signals that propagate through the various networks and the signals on the network link and that propagate through the network interface 224, and the signals that propagate through the transceiver 230, which carry the digital data to and from computer system 100, are exemplary forms of carrier waves transporting the information.

The computer system 100 can send messages and receive data, including user commands, video data, audio data and program codes through the network(s), the network link 234, and the network interface 224. In the Internet example, a server might transmit a requested code for an application program through the ISP, Internet, local network 236 and network interface 224. Instead of or in addition to transmission via the Internet, the computer system 100 can send and receive data via the transceiver 230 and a wireless system, satellite system, cable system, telephone lines or any other system suitable for propagating information between the computer system and an information distribution system. In accordance with one embodiment, one such downloaded application provides for a MPEG video cut and paste operation as described herein. The processor 216 can execute the received code as the code is received, and/or store the code on the fixed disk 222, or other non-volatile storage for later execution. In this manner, the computer system can obtain an application code in the form of a carrier wave.

In one embodiment, a bitstream cut and paste editing solution is provided. Additionally, a frame type conversion for facilitating editing of bitstreams in the compressed domain is provided. A plurality of segments are cut out of a plurality of bitstreams. An appropriate frame type conversion can then be performed on broken GOPs of the cut segments and the edited cut segments are pasted into a new bitstream. In a specific embodiment, this process can be used for any bitstreams that contain I, P, and B frames, such as the bitstreams found in a MPEG environment.

In one embodiment, there will be two different cases of frame type conversions. A first case would be when a broken GOP is less than or equal to a predetermined threshold value and a second case would be when a broken GOP is greater than the predetermined threshold value. In the first case, a P reference frame would be changed to a B frame or an I reference frame would be changed to a P frame in the broken GOP. Additionally, some B frames in the broken GOP would be changed to be one directional prediction only depending on the positions of the reference frames.

In the second case, if the first frame in the broken GOP is not an I frame, the first P frame in the broken GOP would be changed to an I frame and any B frames right before the I frame would be changed to be one directional prediction only. Additionally, some B frames in the broken GOP would be changed to be one directional prediction only depending on the positions of the reference frames. Basically, as is known in the art, B frames are encoded or depend upon reference frames in the past and future. Thus, when a B frame in a broken GOP does not have a past and future reference frame to depend on, the B frame will be encoded to depend on the one reference frame. Accordingly, the B frame will be either backwards or forwards directionally predicted.

The above cases are best illustrated in the following examples found in FIGS. 4 and 5.

Figure 4:
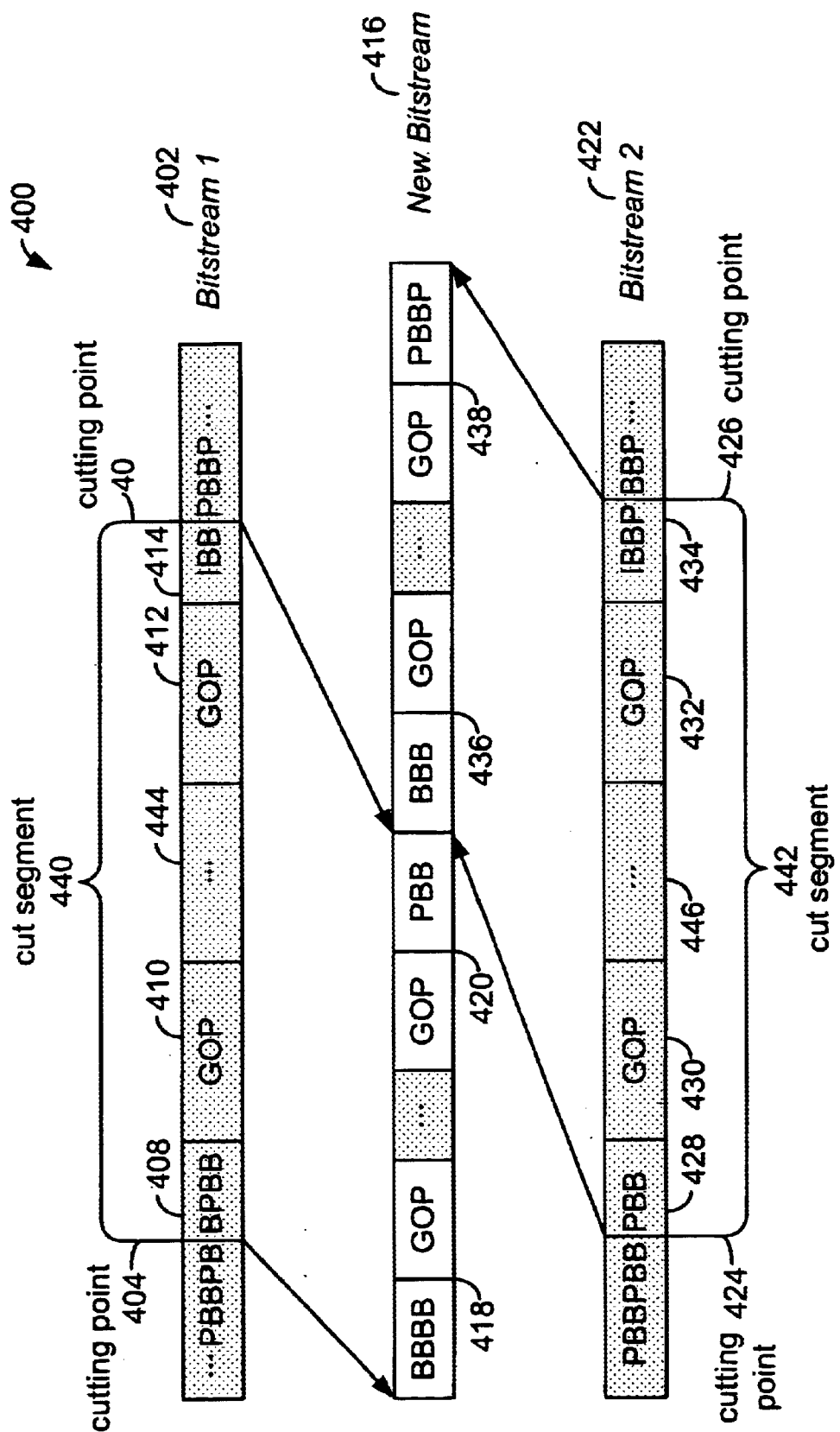
FIG. 4 illustrates the editing process according to case 1.

FIG. 4 illustrates an example, according to one embodiment, of a cut and paste editing operation where a number of frames in a broken GOP is less than a threshold value. System 400 includes a bitstream 402, a bitstream 422, and new bitstream 416. Bitstreams 402 and 422 include a series of groups of frames, such as GOPS. In a specific embodiment, bitstreams 402 and 422 can be MPEG bitstreams or any bitstreams that contain I, P, and B frames. Bitstream 416 includes a plurality of segments that have been cut out of bitstreams 402 and 422 and edited. Additionally, it should be understood that although only bitstreams 402 and 422 are shown, any number of segments can be cut out of any number of bitstreams.

As shown, bitstream 402 is cut at cutting points 404 and 406, forming a cut segment 440. The segment 440 between cutting points 404 and 406 is then used to form a part of bitstream 416. Segment 440 includes a broken GOP 408, GOP 410, an indeterminate number of GOPs 444, GOP 412, and broken GOP 414. Broken GOP 408 contains 4 frames and broken GOP 414 contains 3 frames while GOP 410, GOPs 444, and GOP 412 contain the standard number of frames determined by a variable, such as N, (e.g., N=15). Additionally, in this example, the distance between references frames is three; thus, a variable indicating the distance between reference frames, such as M, would be three.

A threshold value, T, can be empirically determined for the best results and is always less than the size of the GOP or the variable N. In a specific embodiment, the threshold value could be determined as (M+1). Assuming, for example, that threshold T is pre-determined from the variables M and N to be 4; the number of frames, 4, in broken GOP 408 would be compared to the threshold value of 4. Because the number of frames equals the threshold value, broken GOP 408 would be edited as follows: all the reference frames, I or P, in the broken GOP are changed to P or B, respectively. In addition, because the broken GOP is the first broken GOP in the broken segment, the B frames at the beginning of the broken GOP and before the first reference frame in the broken GOP are changed to be one directional prediction only.

Thus, the broken GOP 408 should be edited as follows: the reference frame, P, in the broken GOP 408 is changed to a B frame and the B frames in the broken GOP 408 are changed to be one directional prediction only. In this case, the predicted direction of the converted B frames is backward prediction because the only possible reference frames in the GOP 418 are in the future from the converted B frames. Thus, a larger GOP 418 is formed that includes the four converted frames of the broken GOP 408 and the next GOP 410. The next series of GOPs 444 remain the same until GOP 412.

Just as the number of frames of broken GOP 408 was compared to the threshold value, the number of frames in broken GOP 414 is compared to the threshold value. The comparison shows that the three frames of GOP 414 are less than the threshold value of four. Therefore, broken GOP 414 should be edited as follows: the I frame in broken GOP 414 is changed to a P frame and all B frames in the broken GOP 414 are changed to be one directional prediction only. In this case, the direction prediction of the converted B frames is forward prediction because the only reference frames are in the past in relation to the converted B frames. However, as described hereinafter, if a reference frame existed where a B frame had two reference frames to depend on, those B frames would not need to be converted to be one directional prediction only. Basically, the only B frames that need to be converted are the B frames that do not have a forward and backward reference frame to depend on. Also, the converted P frame by definition depends on a past reference frame. Thus, all frames in the converted broken GOP 414 depend upon a previous reference frame. Therefore, a larger GOP 420 is formed by combining the edited broken GOP 414 with the previous GOP 412. Converted cut segment 440 can then be pasted into new bitstream 416.

As shown, bitstream 422 is cut at cutting points 424 and 426 forming a cut segment 442, which is used to form a part of bitstream 416. Cut segment 442 includes a first broken GOP 428, GOP 430, an indeterminate number of GOPs 446, GOP 432, and a last broken GOP 434. First broken GOP 428 contains 3 frames and last broken GOP 434 contains 4 frames.

The number of frames in broken GOP 428 is compared to the assumed threshold value of four. Because the number of frames of broken GOP 428 is less than the threshold of four, the broken GOP is edited as follows: the P frame in the broken GOP 428 is changed to a B frame and all B frames in the first broken GOP 428 are changed to be one directional prediction only. The direction prediction of the converted B frames is backward prediction because the only possible reference frames are in the future from the converted B frames. Thus, a larger GOP 436 is formed that includes the three converted frames of the broken GOP 428 and the next GOP 430 of the cut segment of bitstream 422. The next series of GOPs 446 remain the same until GOP 432.

Just as the number of frames of broken GOP 428 was compared to the threshold value, the number of frames in broken GOP 434 is compared to the threshold value. The comparison shows that the four frames of GOP 434 are equal to the threshold value. Therefore, the broken GOP is edited as follows: the I frame in GOP 434 is changed to a P frame but all B frames and the P frame in the converted broken GOP 438 remain unchanged. These frames remain the same because there are two reference frames for B frames in GOP 434 or converted GOP 438 and thus, the B frames can remain bi-directionally encoded. Therefore, a larger GOP 438 is again created containing GOP 432, the previous GOP to broken GOP 434, and the converted broken GOP of broken GOP 434. Converted segment 442 can then be pasted into new bitstream 416.

The advantages of this embodiment include that only a few frames limited by threshold T need to be changed from either an I to a P, or from a P to a B. These kinds of changes involve fewer operations, and thus, less complexity. Traditional methods that require changes from a B to I frames or P to I frames involve more operations and are more complicated. Additionally, because I frames require more information, the converted I frames are of a poorer image quality because B and P frames contain less information than a regular I frame. Furthermore, the bitrate reduction resulting from a I to P frame conversion or from a P to B frame conversion provides for an improved video quality and/or better bitrate/buffer control than a B to I or P to I frame type conversion.

Figure 5:
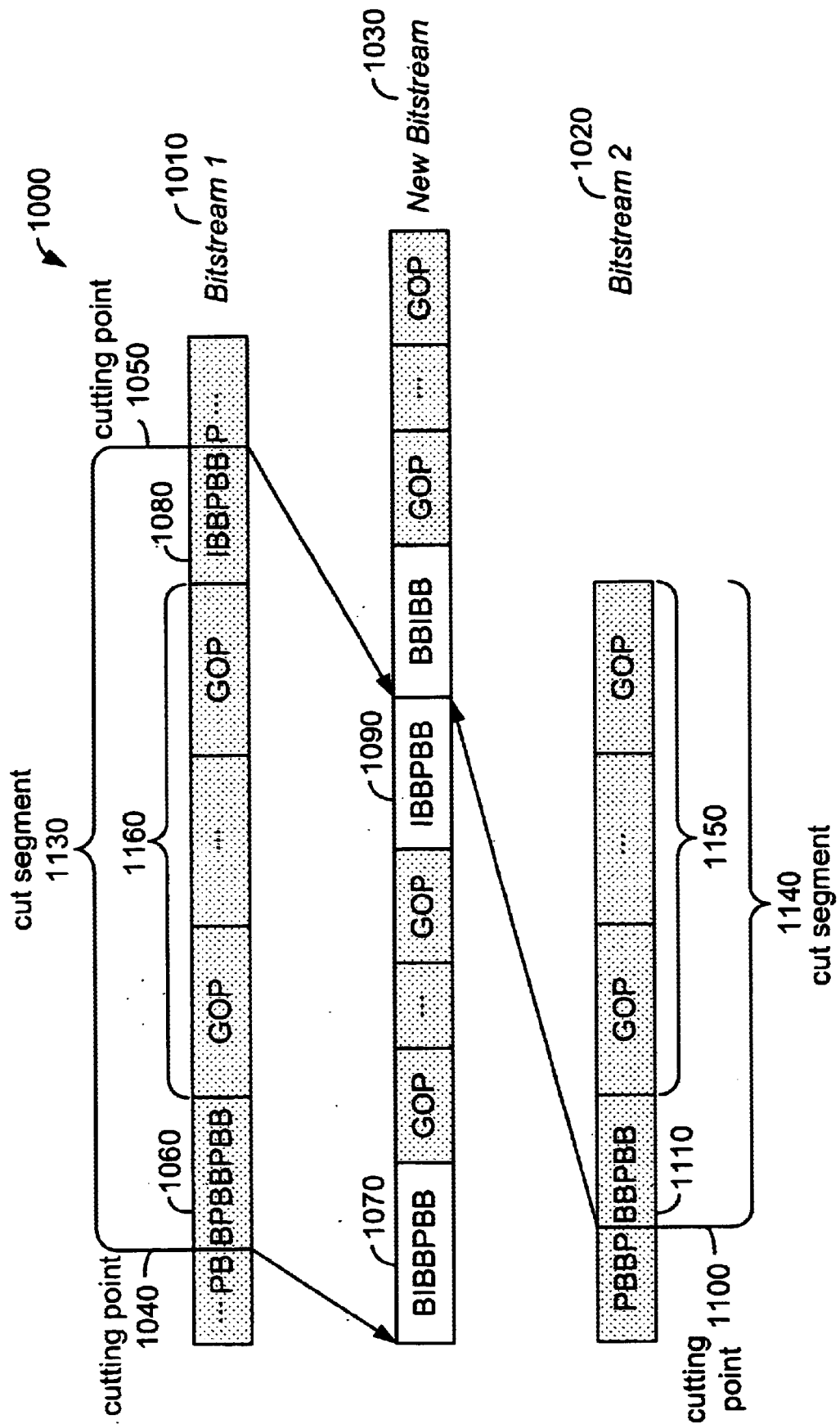
FIG. 5 illustrates the editing process according to case 2.

FIG. 5 illustrates an example, according to one embodiment, where a number of frames in a broken GOP are greater than a threshold value. System 1000 includes a bitstream 1010, bitstream 1020, and bitstream 1030. Bitstreams 1010, 1020, and 1030 include the same features as mentioned above in regards to the bitstreams of FIG. 3.

Cut segment 1130 includes the GOPs in between cutting points 1040 and 1050. Cut segment 1130 includes a broken GOP 1060, an indeterminate number of GOPs 1160, and broken GOP 1080. The number of frames in broken GOP 1060 is compared to the pre-determined threshold value of 4. The number of frames in broken GOP 1060 is seven and is therefore greater than the threshold value T. Thus, the broken GOP 1060 can be edited as follows: the first reference frame in the broken GOP 1060 can be changed to an I frame and any B frames before the converted I frame can be changed to be one directional prediction only. Accordingly, the first P frame in broken GOP 1060 becomes an I frame in the newly created GOP 1070. As shown, newly created GOP 1070 contains the same frames of broken GOP 1060 except that the first P frame has been converted to an I frame. The first P frame has been converted to an I frame because the broken GOP 1060 did not have an I reference frame at the beginning of the GOP. Thus, in order to have an I reference frame in the newly created GOP, the first P frame is converted to an I frame. Additionally, the B frame before the converted I frame will be predictably encoded to be backward prediction only. Thus, a shorter GOP 1070 is generated in bitstream 1030 and it can be seen that the first frame is not necessarily an I frame. Even though the first frame is not an I frame, this GOP format is still MPEG compliant.

The last broken GOP 1080 of cut segment 1130 is compared to the threshold T and it is determined that the number of frames in GOP 1080 is greater than the threshold T of 4. However, no editing needs to be done except for the last two B frames after the last reference P frame. Accordingly, the B frames after the last reference P frame are converted from bi-directional prediction to be backward prediction only. However, if the last frame in the broken GOP is a P frame, no editing would be done to the last cut GOP 1080 because the B frames in broken GOP 1080 would have two reference frames to depend on. Also, this case is different than the first broken GOP 1060 because broken GOP 1080 contains an I reference frame at the beginning of the GOP. GOP 1060 did not contain an I frame at the beginning and thus, needed an I reference frame in the GOP, which is facilitated by the P to I conversion.

Therefore, GOP 1080 becomes newly created GOP 1090, which contains the same frames as cut GOP 1080 and is shorter in length than the standard GOP value of N. Accordingly, edited cut segment 1130 includes a shorter edited GOP 1070, the same series of GOPs, and shorter GOP 1090. This edited segment can then be pasted into bitstream 1030.

Bitstream 1020 is cut at cutting point 1100. Cut segment 1140 is formed including broken GOP 1100 and an indeterminate number of GOPs 1150 until the end of the bitstream. The number of frames in broken GOP 1110 is compared to the threshold value of 4 and it is determined that the number of frames, 5 is greater than the threshold value of 4. Broken GOP 1110 is edited as described in accordance with GOP 1060. Therefore, the first P frame of broken GOP 1110 is changed to an I frame. Additionally, the two B frames before the converted I frame will be predictably encoded to be backward prediction only. Thus, a shorter GOP 1120 is generated with the five frames of broken GOP 1110 except for the I frame that was converted from a P frame. Converted segment 1140, which includes the shorter GOP 1120 and the rest of the series of GOPs 1150, is then pasted into bitstream 1030. Because bitstream 1020 does not include a broken GOP at the end of the segment, a frame type conversion is not necessary. Therefore, the rest of the bitstream is just pasted into a new bitstream 1030 without having a last GOP that is smaller in GOP size.

Some advantages of this embodiment include that only a few B frames (M−1) before the converted I frame need their prediction direction to be changed. Also, the bitrate increase from a P to I frame conversion is much smaller than a B to I frame conversion, thereby implying better bitrate control and buffer control due to its sudden increase of bits in limited buffer size from B to I frame conversion. Furthermore, the frame type conversion occurs in reference frames only (i.e., I and P frames). Thus, the video quality degradation is much less than that of an I or P to B conversion because a P frame has more intra-macroblocks (and thus, better quality) than a B frame.

The above description is illustrated but not restrictive. Many variations of the invention will become apparent to those skilled in the art upon review of this disclosure. The scope of the invention should, therefore, be determined not with reference to the above description, but instead should be determined with reference to the pending claims along with their full scope or equivalence.

What is claimed is:

1. A method for editing a plurality of bitstreams comprising the steps of:
    cutting a plurality of segments from the plurality of bitstreams, the plurality of segments comprising at least one group of frames, wherein the at least one group of frames comprises at least one broken group of frames;
    comparing a number of frames of the at least one broken group of frames in the plurality of segments to a threshold value;
    editing the plurality of segments according to the comparison; and
    creating a new bitstream by combining the edited plurality of segments.

2. The method of claim 1, wherein editing the plurality of segments comprises combining the at least one broken group of frames with a group of frames in the at least one group of frames if the comparison indicates the number of frames is less than or equal to the threshold value.

3. The method of claim 1, wherein editing the plurality of segments comprises creating a group of frames with the at least one broken group of frames if the comparison indicates the number of frames is greater than the threshold value.

4. The method of claim 2, wherein editing the plurality of segments comprises converting a reference frame in the at least one broken group of frames to a P frame.

5. The method of claim 4, wherein the reference frame comprises an I frame.

6. The method of claim 2, wherein editing the plurality of segments comprises converting a reference frame in the at least one broken group of frames to a B frame.

7. The method of claim 6, wherein the reference frame comprises an P frame.

8. The method of claim 2, wherein editing the plurality of segments comprises converting at least one B frame in the at least one broken group of frames to be one directional prediction.

9. The method of claim 3, wherein editing the plurality of segments comprises converting a P frame in the at least one broken group of frames to an I frame.

10. The method of claim 9, wherein converting the P frame comprises converting the first P frame in the at least one broken group of frames.

11. The method of claim 9, wherein editing the plurality of segments comprises converting at least one B frame before the I frame to be one directional prediction only.

12. The method of claim 1, wherein the plurality of bitstreams are MPEG bitstreams.

13. The method of claim 1, wherein the at least one group of frames is at least one group of pictures.

14. The method of claim 1, wherein the at least one broken group of frames is at least one broken group of pictures.

15. A system for editing a plurality of bitstreams comprising:
- a plurality of segments cut from the plurality of bitstreams, wherein the plurality of segments comprise at least one group of frames, wherein the at least one group of frames comprises at least one broken group of frames;
- a comparing process to perform at least one comparison of a number of frames of the at least one broken group of frames to a threshold value;
- an editing process to edit the plurality of segments according to the at least one comparison; and
- a new bitstream comprising the edited plurality of segments.

16. The system of claim 15, wherein the edited plurality of segments comprise a group of frames created by combining the at least one broken group of frames with a group of frames in the at least one group of frames if the at least one comparison indicates the number of frames is less or equal to than the threshold value.

17. The system of claim 15, wherein the edited plurality of segments comprise a group of frames created with the at least one broken group of frames if the at least one comparison indicates the number of frames is greater than the threshold value.

18. The system of claim 15, wherein the plurality of groups of frames comprise I, P, and B frames.

19. The system of claim 16, wherein the at least one broken group of frames comprises an B frame, wherein the B frame is converted from a P frame.

20. The system of claim 16, wherein the at least one broken group of frames comprises an P frame, wherein the P frame is converted from an I frame.

21. The system of claim 16, wherein the at least one broken group of frames comprises an B frame, wherein the B frame is converted to be one directional prediction.

22. The system of claim 17, wherein the at least one broken group of frames comprises an I frame, wherein the I frame is converted from a P frame.

23. The system of claim 17, wherein the at least one broken group of frames comprises an I frame, wherein the I frame is converted from a B frame.

24. The system of claim 17, wherein the at least one broken group of frames comprises a B frame, wherein the B frame is converted to be one directional prediction.

25. The system of claim 22, wherein the converted B frame is before the converted I frame.

26. The system of claim 15, wherein the plurality of groups of frames comprise a group of pictures.

27. The system of claim 15, wherein the plurality of bitstreams comprise a plurality of MPEG bitstreams.

28. A computer-readable medium including instructions for editing a plurality of bitstreams comprising:
- one or more instructions for cutting a plurality of segments from the plurality of bitstreams, the plurality of segments comprising at least one group of frames, wherein the at least one group of frames comprises at least one broken group of frames;
- one or more instructions for comparing a number of frames of the at least one broken group of frames in the plurality of segments to a threshold value;
- one or more instructions for editing the plurality of segments according to the comparison; and
- one or more instructions for creating a new bitstream by combining the edited plurality of segments.

29. A computer data signal embodied in a carrier wave including instructions for editing a plurality of bitstreams comprising:
- one or more instructions for cutting a plurality of segments from the plurality of bitstreams, the plurality of segments comprising at least one group of frames, wherein the at least one group of frames comprises at least one broken group of frames;
- one or more instructions for comparing a number of frames of the at least one broken group of frames in the plurality of segments to a threshold value;
- one or more instructions for editing the plurality of segments according to the comparison; and
- one or more instructions for creating a new bitstream by combining the edited plurality of segments.

* * * * *